E. W. MARBLE & O. E. DINGLEY.
PUMP.
APPLICATION FILED JULY 10, 1912.
1,065,152.
Patented June 17, 1913.
2 SHEETS—SHEET 1.
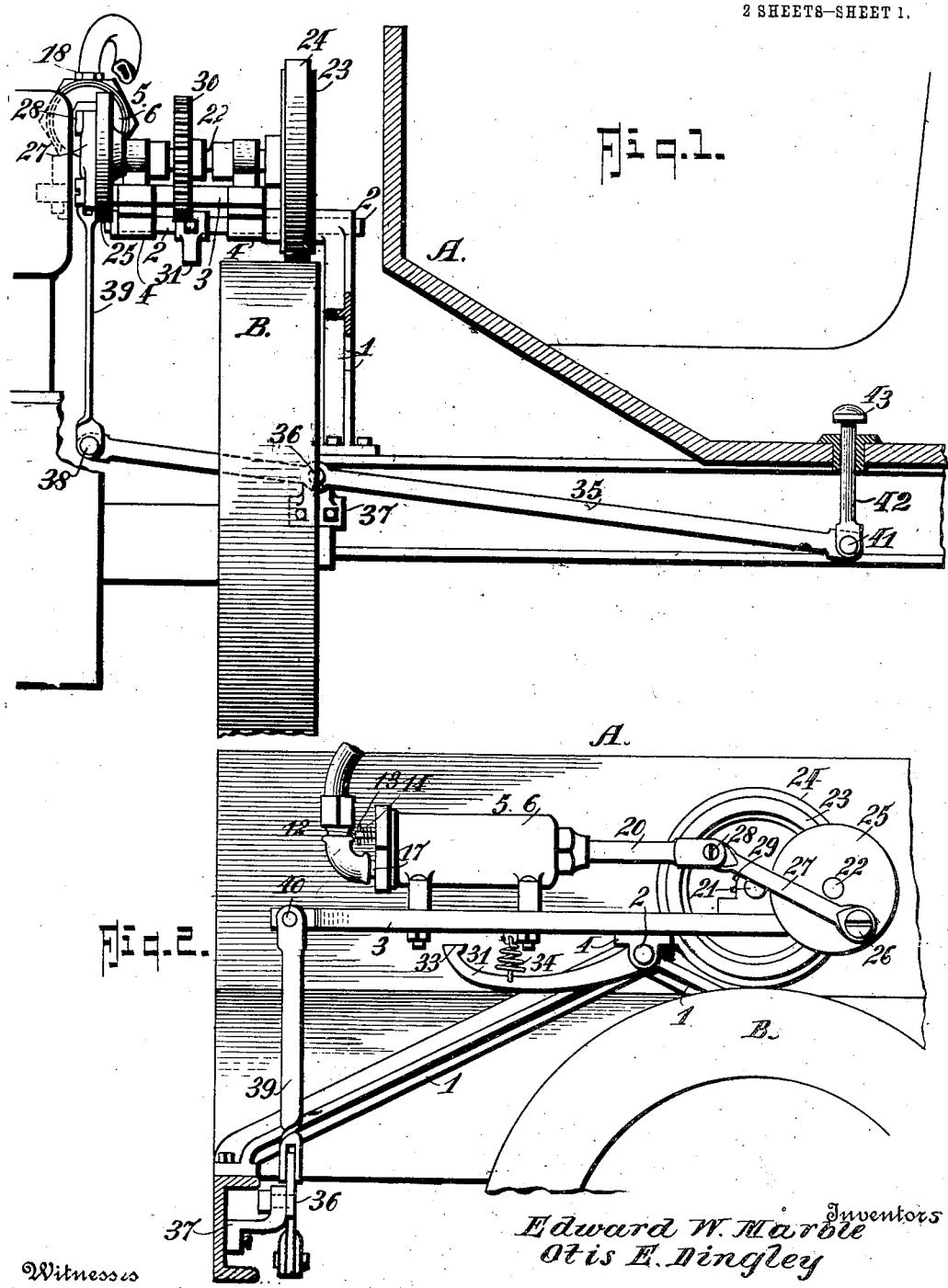
Inventors
Edward W. Marble
Otis E. Dingley E. W. MARBLE & O. E. DINGLEY.
PUMP.
APPLICATION FILED JULY 10, 1912.
1,065,152.
Patented June 17, 1913.
2 SHEETS—SHEET 2.
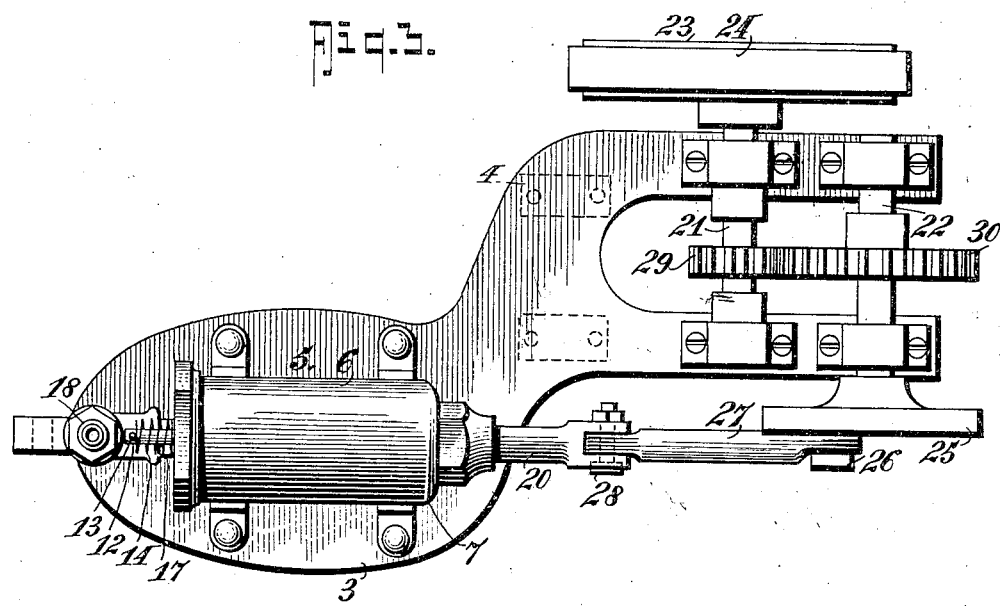
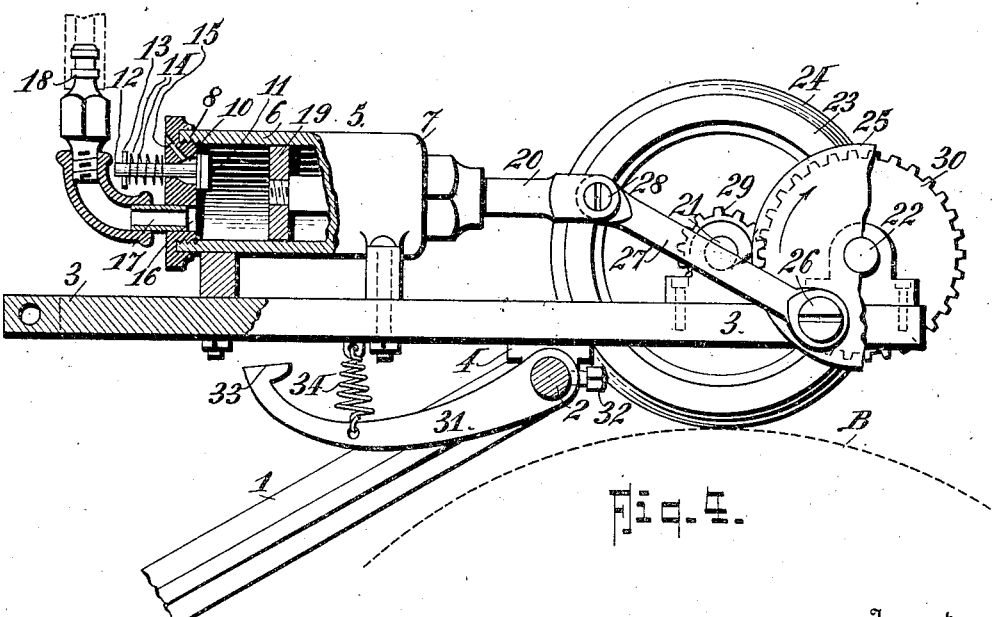
Witnesses
John J. Schrott.
John J. McCarthy
Inventors
Edward W. Marble
Otis E. Dingley
By Victor J. Evans
Attorney

UNITED STATES PATENT OFFICE.

EDWARD W. MARBLE AND OTIS E. DINGLEY, OF WEST FARMINGTON, MAINE.

PUMP.

1,065,152.  Specification of Letters Patent.  Patented June 17, 1913.

Application filed July 10, 1912. Serial No. 708,627.

*To all whom it may concern:*

Be it known that we, EDWARD W. MARBLE and OTIS E. DINGLEY, citizens of the United States of America, residing at West Farmington, in the county of Franklin and State of Maine, have invented new and useful Improvements in Pumps, of which the following is a specification.

This invention relates to improvements in pumps and has particular application to devices of the character set forth which are carried by a motor vehicle and operated from the fly wheel of the motor of such vehicle for inflating tires and other purposes.

In carrying out the present invention, it is our purpose to provide a pump of the character described which may be rendered operative and inoperative at the will of the operator of the vehicle and whereby the tires of such vehicle may be inflated thereby obviating the necessity of resorting to the common hand pump and inconvenience incident thereto.

It is also our purpose to provide a pump which will embody in its construction the desired features of simplicity, efficiency, durability and convenience and which may be manufactured and marketed at a relatively low cost.

Furthermore, we aim to provide a pump which will embrace among other features a base plate pivoted between its ends upon the motor vehicle and carrying adjacent to one end a pump cylinder and adjacent to the other end a driving wheel disposed in proximity to the fly wheel of the motor, means acting to hold the driving wheel normally out of engagement with the fly wheel, and means being provided for swinging the base plate about its pivot to place the driving wheel in engagement with the motor fly wheel and against the action of the first means.

With the above and other objects in view, the invention consists in the construction, combination and arrangement of parts hereinafter set forth in and falling within the scope of the claims.

In the accompanying drawings; Figure 1 is a fragmentary sectional view through a motor vehicle equipped with our improved pump. Fig. 2 is a front elevation of the same. Fig. 3 is a top plan view of the pump removed from the vehicle, and Fig. 4 is a side elevation partly in section of the pump.

Referring now to the accompanying drawings in detail, A indicates the forward portion of a motor vehicle, while B designates the fly wheel of the engine or the motor of such vehicle. Surmounting the side bars of the chassis of the vehicle is a bracket 1 in the upper end of which, in the present instance, is mounted a pivot shaft 2.

Mounted for swinging movement upon the pivot shaft 2 and transversely of the frame of the vehicle is our improved pump mechanism which includes a base plate 3 pivoted between its ends upon the shaft 2 by means of a bracket 4 and having fixed upon its upper surface adjacent to one end and upon one side of the pivot shaft, a pump cylinder 5 which, in the present instance, embraces a cylindrical tube 6 having a closed end 7 and an open end 8, a removable head 9 being threaded into the open end of the tube and closing the same. Formed in the head 9 is a valve seat 10 and coöperating with such seat is an inwardly opening intake valve 11 provided with a stem 12 extending outwardly of the head and carrying adjacent its free end a pin 13, an expansion spring 14 being coiled about the stem 12 between the pin 13 and the adjacent surface of the head 9 and exerting its tension to normally hold the intake valve closed and against the seat. Formed in the head 9 and communicating with the valve seat 10 is a diagonal air inlet passage 15 adapted, when the air inlet valve is open or disengaged from its seat, to permit the intake of air to the cylinder under the action of the piston therein. Also formed in the head 9 adjacent to the valve seat is a discharge bore 16 and threaded into such discharge bore is a tube 17 equipped at its free end with a nipple 18 to which may be connected one end of an air hose having its free end equipped with a suitable form of connector by means of which the hose may be connected to one of the tires of the vehicle thereby enabling the air to be pumped or forced into such tire, a piston 19 being mounted within the cylinder for reciprocation therein and having a piston rod 20 extending outwardly of and through the closed end 7 of the tube.

The parts just described are mounted upon or carried by one end of the base plate 3, while the opposite end of the plate is preferably forked or bifurcated as shown more clearly in Fig. 2, and journaled in the arms of the forked or bifurcated end of the base plate are a pair of spaced parallel shafts 21, 22, the former having keyed to one extremity thereof a driving wheel 23 equipped with a suitable friction band 24 on the periphery thereof and disposed in proximity to the fly wheel of the motor and adapted to be placed in and out of driving engagement with such fly wheel, while the relatively opposite end of the shaft 22 is equipped with a crank disk 25 to the pin 26 of which is fastened one extremity of a pitman 27, the free end of the latter being connected to the piston rod 20 as at 28. In the present instance, the shaft 22 is driven from the shaft 21 through the medium of a pinion 29 keyed upon the shaft 21 intermediate the arms of the bifurcated or forked end of the base plate, and a gear 30 similarly keyed upon the shaft 22 and meshing with the pinion 29. From this construction, it will be seen that when the driving wheel 23 is in driving engagement with fly wheel B of the motor of the vehicle, a reciprocating motion will be imparted to the pump piston within the cylinder 5, through the medium of the shaft 21, pinion 29, gear 30, shaft 22, and the crank disk and pitman 25 and 27 respectively. On the intake or suction stroke of the piston 19, the inlet valve 11 opens under the action of the piston whereby air is drawn into the cylinder and upon the reverse movement of the piston, such inlet valve is closed and the air forced through the hose to the tire.

By pivoting the base plate between its ends and mounting the pump cylinder and piston upon the base plate 1 on one side of the pivot, and the driving means of the piston at the opposite side of the pivot shaft, we obtain an approximately equal distribution of the weight on the base plate, so that such plate may be swung about the pivot shaft with ease and facility to place the driving wheel in and out of driving engagement with the fly wheel. The driving wheel is normally held away from the fly wheel or out of driving engagement therewith and for this purpose an arcuate shaped arm 31 has one end rigidly fastened to the pivot shaft 2 by means of a set screw or the like 32 immediately adjacent the bracket 4, while the opposite end thereof terminates in a bearing lug 33 extending beneath the adjacent end of the base plate 3 and in the path of movement thereof and adapted to be engaged thereby. Interposed between the base plate 3 and the arm 31 and connected at its opposite ends to such base plate and arm respectively, is a helical contractile spring 34 acting normally to swing the base plate about the pivot shaft and disengage the driving wheel of the pump from the motor fly wheel, the bearing lug 33 forming a stop and limiting the movement of the base plate under the action of the spring. Thus, when the pump and its associated parts are not otherwise affected, such pump is inoperative due to the spring 34 acting upon the base plate to hold the driving wheel out of engagement with or away from the fly wheel of the motor.

To render the pump operative, that is, place the driving wheel of the pump in engagement with the fly wheel, any suitable mechanism may be employed, in the present instance, we have shown a system of levers including a horizontally disposed lever 35 pivoted as at 36 between its ends to a bracket 37 depending from the under side of the body of the vehicle, one end of the lever 35 being pivotally connected as at 38 to a link 39 having the free end thereof pivoted as at 40 to the end of the base plate 3 opposite from the driving wheel of the pump, while the opposite end of such lever 35 has pivotally connected thereto as at 41 a pedal rod 42 formed with a pedal 43 disposed within convenient reach of the foot of the operator upon the vehicle seat. Thus, when the rod 42 is depressed under the action of the pedal, the lever 35 is swung about its pivotal connection with the bracket 37 and through the link 39 imparts movement to the base plate 3 to place the driving wheel of the pump in engagement with the fly wheel of the motor.

From the foregoing description taken in connection with the accompanying drawings, the construction, mode of operation and manner of employing our invention will be readily apparent. While we have herein shown and described one particular embodiment of our invention by way of illustration, it is to be understood that we do not confine ourselves to the precise details of construction herein described and delineated, as modification and variation may be made within the scope of the claims and without departing from the spirit of the invention.

We claim:

The combination with a motor driven vehicle, of a pump carried by the vehicle and comprising a pivot shaft secured to an appropriate part of the vehicle, a horizontal base plate pivoted upon said shaft between its ends, a cylinder fast upon the base plate at one side of the pivot thereof, a piston within said cylinder and adapted for reciprocation therein, a driving wheel journaled upon the base plate at the opposite side of the pivot, connections between said driving wheel and piston whereby the latter may be reciprocated, means normally holding the driving wheel out of driving engagement with the fly wheel of the motor, said means comprising an arcuate shaped arm rigidly secured to the pivot shaft adjacent the base plate and lying in a horizontal plane and having the free end thereof terminating in a bearing lug disposed in the path of movement of said plate, and a spring interposed between said arm and base plate and connecting the same and acting to hold the driving wheel normally out of engagement with the fly wheel of the motor, and means for swinging the base plate about its pivot to place the driving wheel in engagement with the motor fly wheel against the action of said spring.

In testimony whereof we affix our signatures in presence of two witnesses.

EDWARD W. MARBLE.
OTIS E. DINGLEY.

Witnesses:
E. HERBERT DINGLEY,
LULA M. HOLWAY.